Aug. 8, 1950        C. A. BOYER        2,517,761
STRINGER FISH SNAP
Filed Sept. 18, 1948
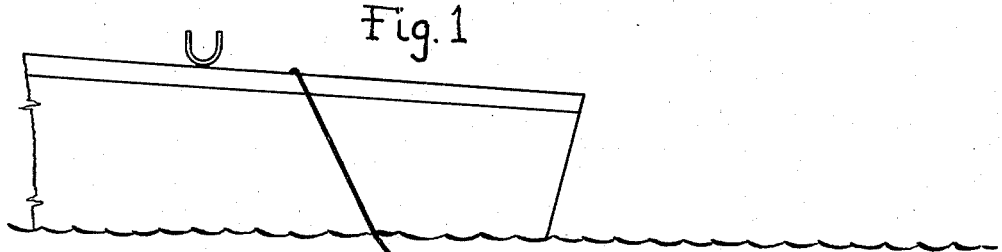
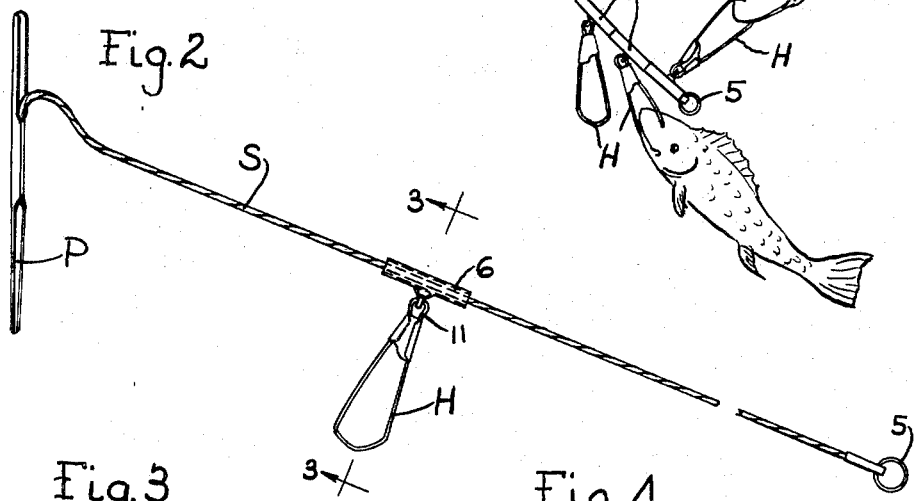
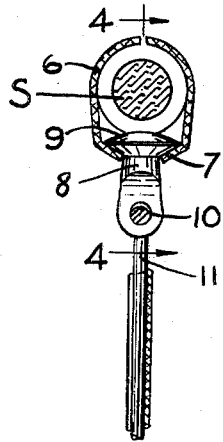
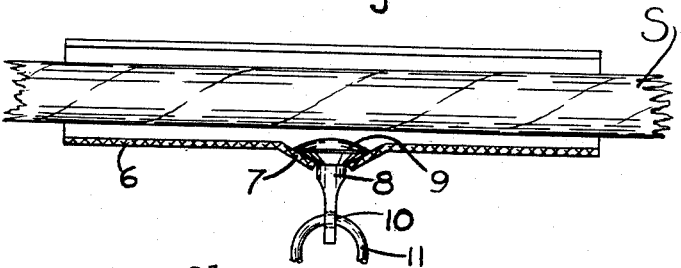
Charles A. Boyer    INVENTOR.
BY
Banning & Banning
Attorneys Patented Aug. 8, 1950

2,517,761

UNITED STATES PATENT OFFICE 2,517,761

STRINGER FISH SNAP

Charles A. Boyer, Winona Lake, Ind.

Application September 18, 1948, Serial No. 49,869

2 Claims. (Cl. 224—7)

This invention relates to a fish stringer, and more particularly to the associated snap hook devices which secure the fish to the stringer and form a part thereof.

When a bait-caster's boat is moved through the water, the captive fish are required to trail overside on a stringer. If the fish are strung through the gills or mouth, they soon drown and die; whereas if they are secured through both lips on one of the snap hooks carried on a stringer, they will stay alive and fresh for a long time. The type of snap hooks in common use often become entangled with each other and with the stringer, especially when there are two or more lively fish on the stringer. My invention overcomes this defect by eliminating twisting and tangling.

The objects of my invention are to provide a means of securing a fish snap hook which (1) will not become entangled with the stringer and with other snaps secured thereon, (2) allows the captive fish a maximum amount of freedom of movement, and (3) is strong, efficient and economical to manufacture.

Referring to the accompanying drawings wherein is illustrated a stringer embodying the features of this invention:

Figure 1 depicts a moving boat from which trails a fish stringer mounting three of my snap devices on two of which are shown captured fish;

Fig. 2 is a side elevation of the fish stringer wherein is shown a single snap hook somewhat enlarged;

Fig. 3 is an enlarged cross sectional view, taken on line 3—3 of Fig. 2; and

Fig. 4 is a longitudinal sectional view, taken on line 4—4 of Fig. 3.

The fish stringer herein shown comprises a flexible stringer element S which may be a cord, wire, or the like, provided at one end with a stop 5, here shown as a ring. The opposite end of the stringer element is stiffened as by the application thereto of an elongated point P of metal or other suitable material. A stringer per se having such a construction is conventional at the present time.

The snap hooks of improved construction adapted for use with a stringer of the kind described comprise in each case a sleeve 6 which at a point medially of its length may be embossed outwardly at 7 to provide a seat having a central hole through which is inserted an elongated shank 8 equipped at one end with a wide head 9 tapered on its underface for loose fitting on the seat 7. The seat and the hole therein are spaced axially a sufficient distance from the stringer to permit limited axial movement of the shank 8. Toward its opposite end the shank may be widened where a hole 10 is formed for receiving therethrough a wire 11 which is comprised in a snap hook H. The wire 11 is of circular formation to permit the snap hook H to swing longitudinally and laterally with relation to the stringer. The shank so formed and assembled in place is free to rotate and also to reciprocate lengthwise of itself for a limited distance; it extends well outwardly from the sleeve at a point remote from its two ends; and it is locked to the sleeve so as to remain assembled therewith.

In use, a captured fish is secured to one of the snap hooks H. The sleeve 6 to which the snap hook is fastened is then threaded over the point P onto the stringer S, the sleeve then being free to slide down the stringer until it comes to rest against the stop 5. Each additional fish is likewise secured to one of the snap-hook-sleeve units which in turn is fitted upon the stringer to be carried thereby.

It will be noted each snap hook is secured to the end of a shank which is free to rotate on its mounting, viz. the sleeve seat 7. The swivel connections thus provided are located at points remote from opposite ends of the sleeves, preferably equidistant therefrom. Because of the factors of location and rotatability of the connecting shanks, whenever two or more fish are secured to the associated snap hooks, they are free to execute a wide range of movements without becoming entangled with each other or with the stringer itself. Furthermore, each sleeve remains free and unimpaired for rotation upon the stringer irrespective of the outward lateral pull to which it is subjected by the captive fish. This is due to the location of its swivel connection with the snap hook at a point medially of the sleeve length rather than at one end thereof. In this respect my present stringer fish snap is a marked improvement over previous constructions wherein the connection between each snap hook and its supporting sleeve has been at or close to one end of the latter, thereby transmitting to the sleeve a pull which deflects the stringer anglewise. The swivel connection thus provided at or near the sleeve center is advantageous also because it is stronger than would be the case if the connection comprised a tongue extended outwardly or downwardly from one end of the sleeve as has been common in the past.

I claim:

1. For use with a fish stringer, a snap hook, and means connecting the snap hook with the stringer comprising a sleeve through which the stringer is loosely extended and whereon the sleeve is free to rotate and slide endwise of itself along the stringer, the wall of the sleeve at a point remote from its two ends being embossed outwardly to provide upon the sleeve interior a tapering seat through which is a round hole whose axis is radial of the sleeve, a shank inserted through the hole and provided at one end with a widened head tapered at its face confronting the seat to enter the seat and rest thereon, the seat being spaced from the stringer a sufficient distance to permit limited axial movement of the shank and the shank exteriorly of the sleeve being widened to a point in excess of the hole diameter whereby to provide a limit stop for endwise movement of the shank inwardly of the sleeve, and means upon the shank, at a point remote from the sleeve and exteriorly thereof, in engagement with the snap hook to complete its connection with the stringer and provide for swinging movement of the snap hook longitudinally and laterally of the stringer, the slidable and rotary movements of the sleeve on the stringer and the rotary and limited slidable movements of the shank and the swinging movements of the snap hook longitudinally and laterally of the sleeve and the stringer affording a captive fish a free, wide range of movement without becoming entangled with the stringer and other captive fish, and the location of the shank at a point remote from the two ends of the sleeve preventing transmission of a lateral pull deflecting the sleeve anglewise and causing the sleeve to bind against the stringer and interfere with free sliding movement of the sleeve.

2. For use with a fish stringer, a snap hook, and means connecting the snap hook with the stringer comprising a sleeve through which the stringer is loosely extended and whereon the sleeve is free to rotate and slide endwise of itself along the stringer, the wall of the sleeve at a point remote from its two ends being provided with a hole, a shank inserted in and slidable through the hole and provided at one end with a widened head formed to engage the sleeve wall upon its interior face, said hole being spaced axially a sufficient distance from the stringer to permit limited axial movement of the shank and the shank exteriorly of the sleeve being widened to a point in excess of the hole diameter whereby to provide a limit stop for endwise movement of the shank inwardly of the sleeve, and means upon the shank, at a point remote from the sleeve end and exteriorly thereof, in engagement with the snap hook to complete its connection with the stringer and provide for swinging movement of the snap hook longitudinally and laterally of the stringer, the slidable and rotary movements of the sleeve on the stringer and the rotary and limited slidable movements of the shank and the swinging movements of the snap hook longitudinally and laterally of the sleeve and the stringer affording a captive fish a free, wide range of movement without becoming entangled with the stringer and other captive fish, and the location of the shank at a point remote from the two ends of the sleeve preventing transmission of a lateral pull deflecting the sleeve anglewise and causing the sleeve to bind against the stringer and interfere with free sliding movement of the sleeve.

CHARLES A. BOYER.

REFERENCES CITED

The following references are of record in the file of this patent:

UNITED STATES PATENTS

| Number | Name | Date |
|---|---|---|
| 1,417,759 | McNeice | May 30, 1922 |
| 1,713,779 | Overton | May 21, 1929 |
| 2,004,247 | McCaul | June 11, 1935 |
| 2,297,623 | Hickman | Sept. 29, 1942 |